(No Model.)

F. ECAUBERT.
CONNECTION FOR CYCLE CHAINS.

No. 602,633.  Patented Apr. 19, 1898.

Witnesses
Chas. H. Smith
J. Staib

Inventor
Frederic Ecaubert
per L. W. Serrell & Son
Attys

UNITED STATES PATENT OFFICE.

FREDERIC ECAUBERT, OF BROOKLYN, NEW YORK.

CONNECTION FOR CYCLE-CHAINS.

SPECIFICATION forming part of Letters Patent No. 602,633, dated April 19, 1898.

Original application filed April 5, 1897, Serial No. 630,682. Divided and this application filed December 10, 1897. Serial No. 661,341. (No model.)

*To all whom it may concern:*

Be it known that I, FREDERIC ECAUBERT, a citizen of the United States, residing at Brooklyn, in the county of Kings and State of New York, have invented an Improvement in Connections for Cycle-Chains and Similar Devices, of which the following is a specification.

The sprocket-chain upon a bicycle is usually made of links with the pivot-pins riveted in position; but the chain has to be separable for passing the same around the sprocket-wheels, and a screw has been provided in place of a rivet for connecting the two ends of the chain together; but the screw is liable to turn and become disconnected, and to prevent this a nut has usually been screwed upon the projecting end; but this is also liable to become loose and also to catch in the clothing or in portions of the cycle.

In the present improvement I apply a spring-latch upon the screw itself, such spring-latch being adapted to use in place of a screw-driver for unscrewing or screwing up the pivot-screw, and the spring-latch lies flat against the link of the chain and engages such link or the head of the adjacent rivet, so that liability for the spring-arm to move is effectually prevented, and the spring-arm becomes a lever for rotating the screw in connecting or disconnecting the ends of the chain.

Figure 1:
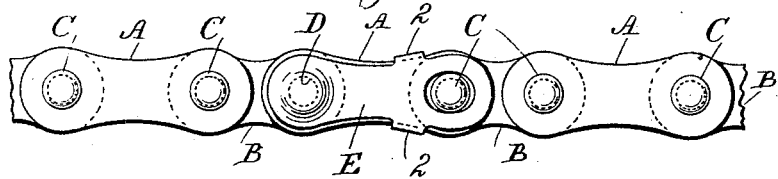
Figure 2:
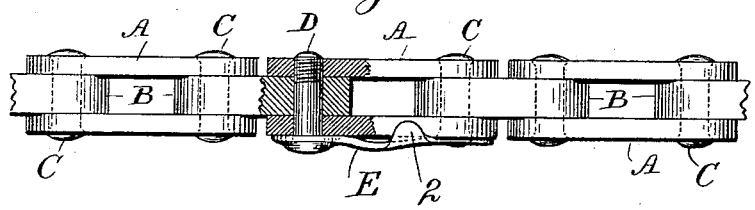

In the drawings, Figure 1 is a side view showing the spring-latch and a portion of the chain. Fig. 2 is a plan view, partly in section, at right angles to Fig. 1; and Fig. 3 illustrates a modification in the shape of the spring-latch.

The links A and B of the chain are of any desired size or character, and usually they are connected by the pivot-rivets C. The screw D, however, forms the pivot for connecting the links at the ends of the chain, so as to make such chain endless when connected up, and upon the head of this screw is a spring-arm E, of a size and shape adapted to lie closely against the side of one of the chain-links.

Figure 3:
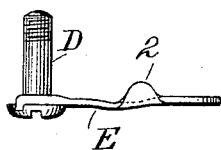

The screw may have a head adapted to the reception of a screw-driver, as shown in Fig. 3; but I prefer to make the spring-arm as the head of the screw or as directly connected with such head, so that the screw and the arm can be turned together, and at the outer end of the spring-arm is a latch adapted to engage the link, so as to prevent the arm moving or the screw turning. This latch may be of any desired character. I have, however, represented lips at 2, adapted to form the latch by engaging opposite edges of the link; but, if desired, the latch may be formed by a hole or recess at or near the end of the spring-arm engaging the end of the rivet C of the chain. In either instance the end of the spring-arm is to be drawn away from the link sufficiently for rotating the screw by or with the spring-arm for unscrewing such screw and separating the chain, and when the chain is to be connected the reverse operations are performed, the screw being inserted in place through the end links and rotated to screw it firmly into position, and the spring holds the arm by the engagement of the latches to prevent the screw turning back.

This improvement allows the chain to be opened and removed without the use of a screw-driver or returned to position after being cleaned or lubricated, and under all circumstances there are no projections to engage the clothing or come into contact with other portions of the cycle.

In the form shown in Fig. 3 the spring is connected with a screw having a slotted head. This may be effected by soldering the parts together or by a cross-lip on the spring engaging the under side of the head.

I claim as my invention—

1. The combination with the chain-links, of a screw for connecting the links and forming a pivot and a spring-arm connected to and turning with the screw and a latch or projection for holding the spring and preventing the spring-arm and screw turning backward, substantially as set forth.

2. The combination with the chain-links, of a screw for connecting the end links and forming a pivot and a spring-arm connected to and turning with the head of the screw and having clips at opposite sides for forming latches that engage the edges of the link and prevent the screw turning until the arm is sprung back to disengage the latches, substantially as set forth.

Signed by me this 7th day of December, 1897.

F. ECAUBERT.

Witnesses:
GEO. T. PINCKNEY,
E. E. POHLE.